United States Patent
Tang et al.

(10) Patent No.: US 8,712,430 B2
(45) Date of Patent: Apr. 29, 2014

(54) SYSTEM AND METHOD FOR DERIVING CELL GLOBAL IDENTITY INFORMATION

(75) Inventors: Binsong Tang, Guangdong (CN);
Thawatt Gopal, San Diego, CA (US);
Hongyuan Wang, Guangdong (CN);
Hailong Wang, Guangdong (CN)

(73) Assignee: FutureWei Technologies, Inc., Plano, TX (US)

( * ) Notice: Subject to any disclaimer, the term of this patent is extended or adjusted under 35 U.S.C. 154(b) by 569 days.

(21) Appl. No.: 12/888,215

(22) Filed: Sep. 22, 2010

(65) Prior Publication Data

US 2011/0070897 A1 Mar. 24, 2011

Related U.S. Application Data

(60) Provisional application No. 61/245,601, filed on Sep. 24, 2009.

(51) Int. Cl.
*H04W 24/00* (2009.01)

(52) U.S. Cl.
USPC .................. 455/456.1; 455/422.1; 455/115.1; 455/226.1

(58) Field of Classification Search
USPC ........... 455/436–439, 422.1, 507, 456.1, 466, 455/115.1, 115.3, 115.4, 226.1, 226.2, 455/226.4
See application file for complete search history.

(56) References Cited

U.S. PATENT DOCUMENTS

| | | | | |
|---|---|---|---|---|
| 8,265,033 | B2 * | 9/2012 | Gunnarsson et al. | 370/331 |
| 2008/0207207 | A1 * | 8/2008 | Moe et al. | 455/439 |
| 2009/0047968 | A1 * | 2/2009 | Gunnarsson et al. | 455/446 |
| 2009/0176490 | A1 * | 7/2009 | Kazmi et al. | 455/434 |
| 2009/0239533 | A1 * | 9/2009 | Somasundaram et al. | 455/434 |
| 2010/0197311 | A1 * | 8/2010 | Walldeen et al. | 455/444 |
| 2010/0291934 | A1 * | 11/2010 | Lopes | 455/446 |
| 2010/0311407 | A1 * | 12/2010 | Yao et al. | 455/422.1 |
| 2011/0026493 | A1 * | 2/2011 | Gao et al. | 370/332 |
| 2011/0092214 | A1 * | 4/2011 | Iwamura | 455/438 |
| 2011/0263282 | A1 * | 10/2011 | Rune et al. | 455/507 |
| 2011/0319091 | A1 * | 12/2011 | Lee et al. | 455/450 |
| 2012/0021748 | A1 * | 1/2012 | Ostrup | 455/437 |
| 2012/0244903 | A1 * | 9/2012 | Fong et al. | 455/517 |

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V8.9.0, Jun. 2009, 5 pages.

(Continued)

*Primary Examiner* — Cong Tran
(74) *Attorney, Agent, or Firm* — Slater & Matsil, L.L.P.

(57) ABSTRACT

A system and method for deriving cell global identity information are provided. A method for deriving cell global information includes receiving, at a first cell, a measurement report, determining a second identifier for the second cell based on a first identifier and information about the first cell, and adding the second cell to a cell list. The measurement report includes the first identifier of a second cell, and the second identifier is used to reference the second cell.

31 Claims, 10 Drawing Sheets

(56) References Cited

OTHER PUBLICATIONS

"LTE; Evolved Universal Terrestrial Radio Access (E-UTRA); S1 Application Protocol (S1AP) (3GPP TS 36.413 version 8.6.1 Release 8)," 3GPP, ETSI TS 136 413, V8.6.1, Jul. 2009, 2 pages.

"3$^{rd}$ Generation Partnership Project; Technical Specification Group Radio Access Network; Evolved Universal Terrestrial Radio Access Network (E-UTRAN); Self-configuring and self-optimizing network (SON) use cases and solutions (Release 9)," 3GPP TR 36.902, V9.2.0, Jun. 2010, 21 pages.

Ericsson, "Introduction of automatic neighbour relation function," R3-072014, 3GPP TSG RAN WG3 Meeting #57bis, Oct. 8-11, 2007, 6 pages, Sophia Antipolis, France.

QUALCOMM Europe, et al., "Inter-RAT/frequenct Automatic Neighbour Relation Function," R2-074907, 3GPP TSG RAN2#60, Nov. 5-9, 2007, pp. 1-6, Jeju, South Korea.

"3$^{rd}$ Generation Partnership Project; Technical Specification Group Core Network and Terminals; Numbering, addressing and identification (Release 8)," Technical Specification, 3GPP TS 23.003, V8.1.0, Jun. 2008, 60 pages.

\* cited by examiner

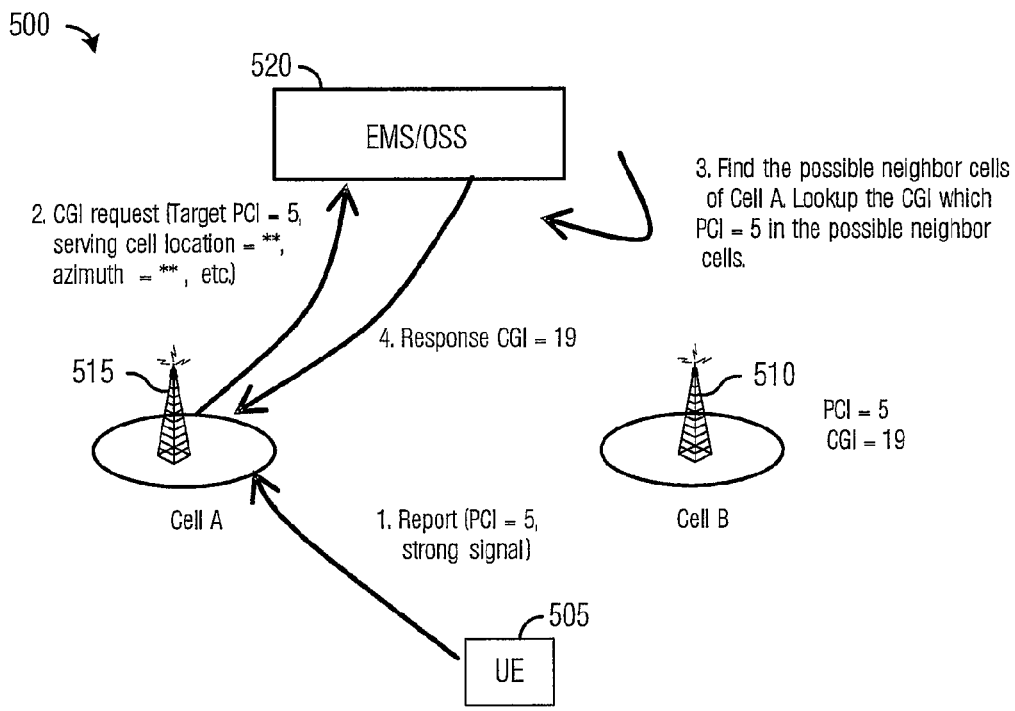
*Fig. 5*
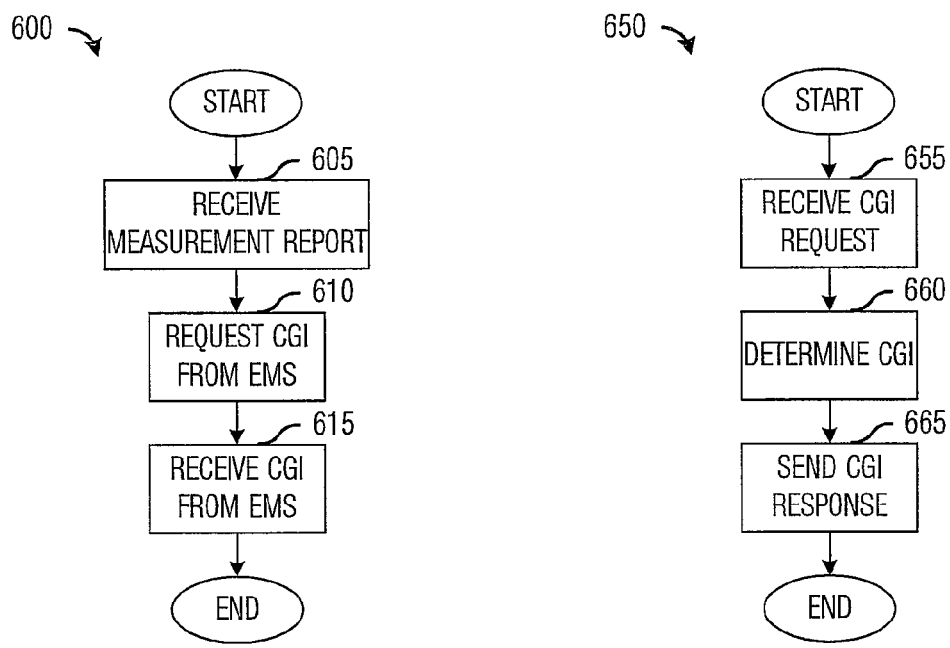
*Fig. 6a*          *Fig. 6b*

SYSTEM AND METHOD FOR DERIVING CELL GLOBAL IDENTITY INFORMATION

This application claims the benefit of U.S. Provisional Application No. 61/245,601, filed Sep. 24, 2009, entitled "System and Method for Deriving Cell Global Identity Information," which application is hereby incorporated herein by reference.

TECHNICAL FIELD

The present invention relates generally to wireless communications, and more particularly to a system and method for deriving cell global identity information (CGI).

BACKGROUND

Generally, positional information may be an identifier for cells in a wireless communications system. Positional information provides a way to geographically locate User Equipment (UE) wirelessly connected to cells in a wireless communications system. Positional information may be useful for features such as location-based services which allow a user, service provider, content provider, advertiser, and so on, to filter or adjust content based on the location of the user, for example. Positional information may also be useful for emergency services, such as for locating a user in the event of an emergency.

Positional information may be terminal based (global positioning system, observed time difference, or so on) or network based (CGI, time of arrival, or so forth). Network based positional information makes use of network specific information to derive positional information for a user. For example, CGI may make use of information related to a cell that is serving a UE to determine the location of the user.

The positional information, e.g., CGI, may be used to generate an automatic neighbor relationship (ANR), which may be used by planning tools for neighbor assignment, automatic discovery, controlling neighbor relations using blacklisting and whitelisting, for example.

A prior art technique for determining CGI may involve a UE making air-interface measurements to assist in determining CGI. However, not all UEs may support the air-interface measurements. Additionally, determining CGI from the air-interface measurements may take a significant amount of time, especially when operating conditions are poor. Therefore, there is a need for alternatives in determining CGI.

SUMMARY OF THE INVENTION

These and other problems are generally solved or circumvented, and technical advantages are generally achieved, by preferred embodiments of the present invention which provides a system and method for deriving cell global identity information.

In accordance with a preferred embodiment of the present invention, a method for deriving cell global information is provided. The method includes receiving, at a first cell, a measurement report. The measurement report includes a first identifier of a second cell. The method also includes determining a second identifier for the second cell based on the first identifier and information about the first cell, and adding the second cell to a cell list. The second identifier is used to reference the second cell.

In accordance with another preferred embodiment of the present invention, a method for deriving cell global information is provided. The method includes receiving a second identifier request from a first cell. The second identifier request includes a first identifier of a second cell and information related to the first cell. The method also includes determining the second identifier from the first identifier and the information related to the first cell, and transmitting the second identifier to the first cell.

In accordance with another preferred embodiment of the present invention, a method of deriving cell global information is provided. The method includes receiving, at a first cell, a measurement report. The measurement report includes a first identifier of a second cell. The method also includes selecting a first preferred second identifier derivation technique. The selecting is based on a selection function. The method further includes deriving a second identifier for the second cell using the first preferred second identifier derivation technique, and adding the second cell to a cell list. The deriving is based on the first identifier and information about the first cell, and the second identifier is used to reference the second cell.

In accordance with another preferred embodiment of the present invention, a network entity is provided. The network entity includes a compute unit, a messaging unit coupled to the compute unit, and a transmitter coupled to the messaging unit. The compute unit derives a second identifier for a first cell based on a first identifier for the first cell and info nation related to a second cell, the messaging unit generates a message containing the second identifier, and the transmitter sends the message containing the second identifier.

An advantage of an embodiment is that techniques for deriving CGI information without requiring air-interface measurements from UE are provided. Not requiring air-interface measurements may be advantageous since not all UEs are capable of determining CGI information from air-interface measurements. Furthermore, A further advantage of an embodiment is that deriving CGI information without requiring air-interface measurements may be performed quickly. Quick determination of CGI information is advantageous since due to operating conditions, e.g., poor signal conditions, there may be significant delay in determining CGI information from the air-interface measurements, which may negatively impact performance.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 5 is a diagram of a communications system, wherein CGI derivation is based on eNB/EMS specific operations;

FIG. 6a is a flow diagram of eNB operations in deriving CGI based on eNB/EMS specific operations;

FIG. 6b is a flow diagram of EMS operations in deriving CGI based on eNB/EMS specific operations;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Third Generation Partnership Project (3GPP) Long Term Evolution compliant communications system. The invention may also be applied, however, to other communications systems, such as WiMAX, WCDMA, UMTS, and so on, compliant communications systems, as well as interworkings thereof.

Figure 1:
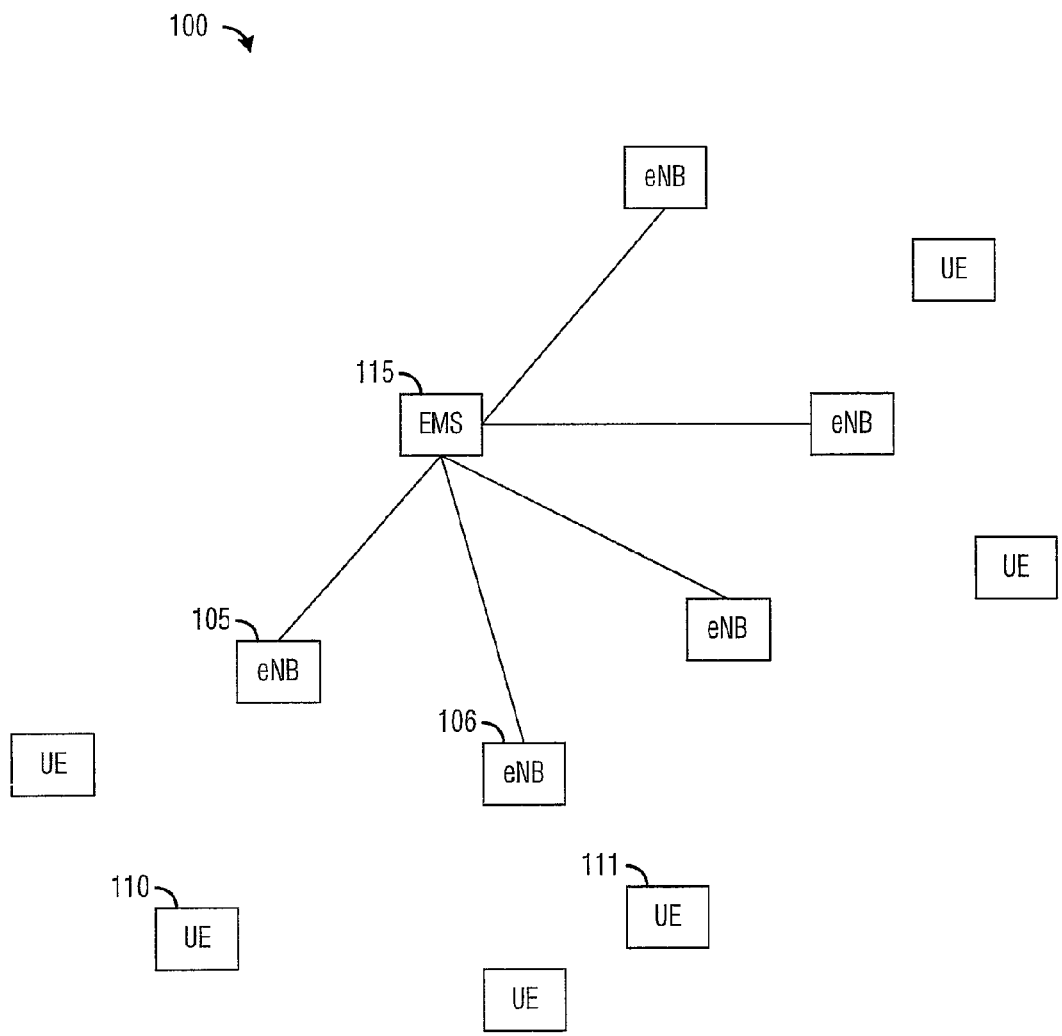
FIG. 1 is a diagram of a communications system.

FIG. 1 illustrates a communications system 100. Communications system 100 includes a plurality of eNBs, such as eNB 105 and eNB 106. Each eNB may serve a number of UEs. For example, eNB 105 may serve UE 110 among other UEs, while eNB 106 may serve UE 111. An eNB may control transmissions to a UE as well as transmissions from a UE.

An element management system (EMS) 115 may be coupled to the eNBs in communications system 100 and may be used to manage the eNBs. EMS 115 may be used to configure the eNBs, change/update configuration information in the eNBs, add/remove deployed carriers, determine neighboring cells of an eNB, and so forth. EMS 115 may be connected to the eNBs over a wireline or wirelessly.

Figure 2:
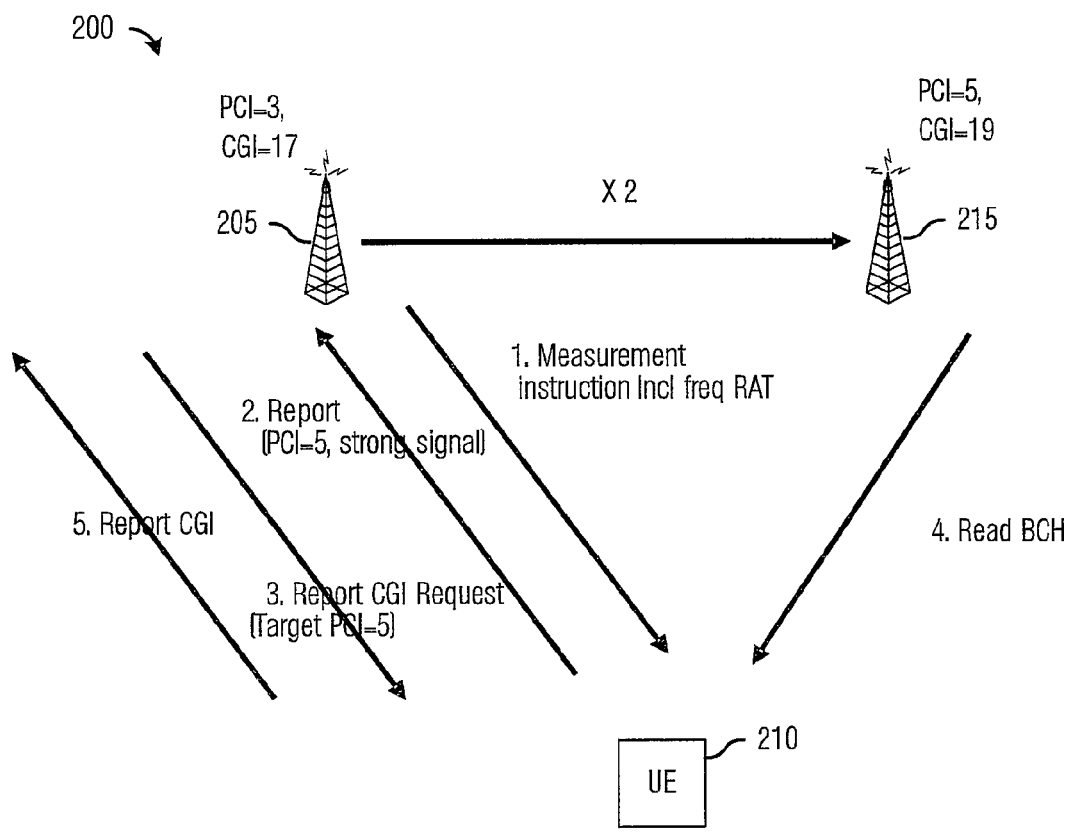
FIG. 2 is a is a diagram of a communications system, wherein a prior art procedure for ANR using CGI is shown.

FIG. 2 illustrates a communications system 200, wherein a prior art procedure for ANR using CGI is shown. The prior art ANR procedure using CGI includes a first enhanced NodeB (eNB) 205, also commonly referred to as a base station, base terminal station, controller, communications controller, and so on, sending a measurement instruction to a UE 210, also commonly referred to as a mobile station, communications device, user, terminal, and so forth (shown as event #1). The measurement instruction may include information such as frequency to measure, radio access technology (RAT), and so on.

UE 210 may respond back with a report of a signal from a second eNB 215 (shown as event #2). The report of the signal corresponding to second eNB 215 may include information such as a physical cell identity (PCI) of second eNB 215, as well as an indication of a relative strength of the signal, such as, strong, weak, medium, and so on.

If first eNB 205 determines that second eNB 215 is a new neighbor, first eNB 205 may instruct UE 210 to perform a CGI measurement using air-interface measurements (shown as event #3). UE 210, upon receiving the CGI measurement instruction will measure a broadcast channel (BCH) of second eNB 215 (shown as event #4). UE 210 may determine CGI from the BCH and report the CGI to first eNB 205 (shown as event #5). Communications system 200 may add second eNB 215 to its ANR accordingly.

Essential ideas of ANR include:
UE can read PCI of neighbor cells;
UE can further read CUT of neighbor cells and report neighbor cell's CGI to the serving eNB;
Serving eNB is able determine neighbors of the serving cell based on the information from the UE without pre-planning;
eNB is able to establish an X2 link with neighbors if necessary.

Value of ANR include:
Saves cost of neighbor cell planning;
Improves precision in finding all neighbors of a cell;
Dynamically optimizes neighbor relations online;
Determines potential PCI conflicts.

Disadvantages of determining CGI based on air-interface measurements include:
BCH reading time to determine the CGI may cause additional delay in detecting and determining a new neighbor cell;
Time delay for mobility before neighboring relation is detected by PCI synchronization and CGI BCH reading (especially for GSM SI3 and even SI13 reading);
Possible handoff (HO) failure in case neighboring relation can not be established on time;
UE may not support determining CGI based on air-interface measurements.

The embodiments described herein provide an alternative to the existing method of relying on deriving CGI based on air-interface measurements. The embodiments bypass the CGI air-interface measurements by using a mechanism that avoids the air-interface CGI measurements. The mechanism relies on a unique mapping between the PCI and CGI identities such that if the PCI is known, the CGI may be derived using such information as the geo-location and antenna configuration of the eNB where the PCI measurement was received.

Figure 3:
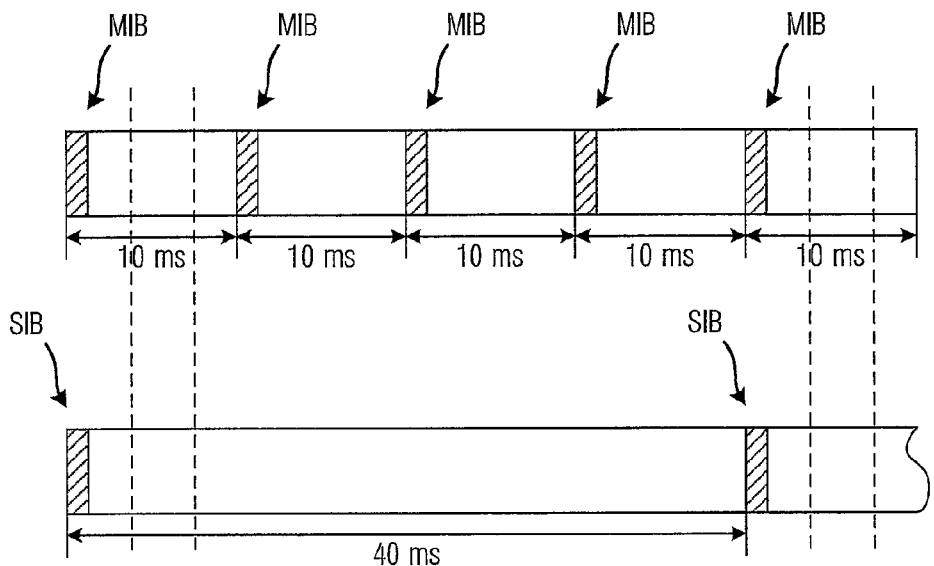
FIG. 3 is a diagram of MIB and SIB readings in UMTS.

In WCDMA (UMTS), the CGI may be defined as:

$$\text{Global Cell ID} = \text{PLMN ID} + \text{RNC ID} + \text{CELL ID},$$

where PLMN ID is Public Land Mobile Network ID, and RNC ID is Radio Network Controller ID. The combination of PLMN ID, RNC ID and CELL ID will uniquely identify the cell in UMTS. The CELL ID is broadcasted in System Information Block 3/4 (SIB 3/4). After the UE accesses and synchronizes to the UMTS cell, the UE may need up to 80 ms to read the Master Information Block (MIB) since the MIB is broadcasted every 10 ms with repetition factor of 8 (MIB SIB_REP is 8, 8*10 ms) while the time to read the SIB may cost the UE 40 ms~160 ms (SIB SIB_REP are 4, 8, 16, 32, 64, 128, 256, 512, 1024, 2048, 4096). The SIB reading time varies according to different configuration by different operator. FIG. 3 illustrates MIB and SIB readings in UMTS.

Table 1 illustrates UMTS Terrestrial Radio Access Network (UTRAN) CGI information, broadcast location and periodicity.

TABLE 1

|  |  | Location | Periodicity |
|---|---|---|---|
| To UTRAN | LAI | PLMN ID in MIB LAC in SIB1 ("CN common GSM-MAP NAS system information") | MIB every 80 ms (fixed) SIB1 configurable, often 320 ms |
|  | RAC | SIB1 ("CN domain system information" for PS domain) | Configurable, often 320 ms |
|  | RNC-ID | SIB3 and also SIB4 (Part of "Cell Identity") | Configurable, often 320 ms |

In GSM, the CGI is broadcasted via Broadcast Control Channel (BCCH) SIB3 and the BSS and cell within the BSS are identified within a location area or routing area by adding a Cell Identity (CI) to the location area or routing area identification, as shown below. The CI is of fixed length with 2 octets and it can be coded using a full hexadecimal representation.

Figure 4:
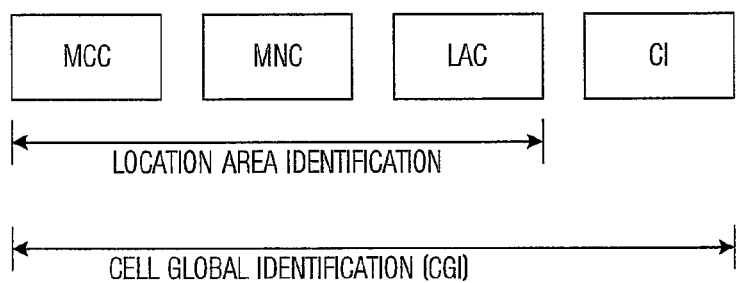
FIG. 4 is a diagram of a GSM CGI.

CGI may be the concatenation of the Local Area Identification (LAI) and the CELL ID. CELL ID may be unique within a location or area. FIG. 4 illustrates a GSM CGI.

CGI reading will be finished within SIB3 cycle (refer to 3GPP TS23.003 technical standards, which are incorporated herein by reference, for a detailed description). To achieve UE (MS) mobility some essential extra information will be needed, e.g., RAC which is used for packet switched call handover. The information needs UE to read SIB13 which is configurable, often 1.92 or 3.84 seconds (maximum 7.68 s).

SI3 is sent on BCCH norm for TC=2 and TC=6, i.e., 2 times per 51 multiframe while SI13 can be sent on either TC=4 (BCCH norm) or on TC=0 (BCCH ext), i.e., once per 51 multiframe. Also note that SI13 is only sent in case of GPRS and when no PBCCH is configured in the cell (refer to 3GPP TS 45.002 technical standards, which are incorporated herein by reference, for a detailed description).

Table 2 illustrates GERAN CGI Information, broadcast location and periodicity.

TABLE 2

|  |  | Location | Periodicity |
|---|---|---|---|
| To GERAN (assuming BCCH) | PLMN identity | SI3 | Fixed every 960 ms |
|  | LAC | SI3 | Fixed every 960 ms |
|  | CI | SI3 | Fixed every 960 ms |
|  | RAC | SI13 | Configurable, often 1.92 or 3.84 seconds (maximum 7.68 s) |

On initial analysis, it may seem possible that CELL ID in CGI may be derived from PCI using a vendor specific algorithm. However, from a standards perspective (such as 3GPP TS36.311, 3GPP TS23.003, 3GPP TS36.413, and so on) there may be no description of a relationship between PCI and CELL ID in CGI for a LTE communications system. CGI for a LTE communications system includes Mobile Country Code (MCC), Mobile Network Code (MNC), and cell identity (CI). Its CI may be configurable by an operator to uniquely identify a cell in the relevant PLMN.

Using a unique association between PCI to the CELL ID in the CGI may enable a bypassing of the CGI air-interface measurement when the system only has the PCI air-interface measurements. Therefore, it may be possible for the system to derive the CGI.

According to 3GPP TS36.300 technical standards, which are incorporated herein by reference, the CGI may be defined as:

CGI=PLMN ID+E-UTRAN CELL ID, where the E-UTRAN CELL ID is a 28-bit value that is a combination of a 20-bit eNB address and a 8-bit CELL ID. However, there may be no mandatory relationship between PCI and CGI.

Also according to protocol, there may be a total of 504 PCI values, but CGI should be unique throughout the entire PLMN network. Therefore, the PCI may be reused, which may imply that there may be several cells which have the same PCI but different CGI.

Therefore, with the CGI being a 28-bit value, a mapping from the 9-bit PCI value into the 28-bit CGI may be possible. The mapping between PCI and CGI would then facilitate the eNB to obtain or derive the CGI without having to request the UE to perform CGI air-interface measurements.

FIG. 5 illustrates a communications system 500, wherein CGI derivation is based on eNB/EMS specific operations. As shown in FIG. 5, CGI derivation using eNB/EMS specific operations may begin with a UE 505 sending a measurement report regarding a first cell, such as Cell B 510, to its serving cell, Cell A 515 (shown as event #1). The measurement report may contain the PCI of Cell B 510 but not it's CGI.

When Cell A 515 receives the measurement report from UE 505 containing the PCI of Cell B 510, Cell A 515 may send a CGI request to an EMS (OSS) 520 (shown as event #2). The CGI request may include the PCI (referred to as a target PCI) of Cell B 510 along with geo-location information, antenna azimuth information, antenna down tilt information, and so forth, of Cell A 515 as parameters.

After EMS 520 receives the CGI request, EMS 520 may calculate a possible (potential) neighbor cell list based on the geo-location information, antenna azimuth information, antenna down tilt information, and so forth, of Cell A 515 (shown as event #3). EMS 520 may then lookup the CGI with the target PCI in a possible neighbor cell list (also shown as event #3).

If EMS 520 finds a unique CGI with the target PCI, EMS 520 may respond to the CGI request by providing the unique CGI to Cell A 515 (shown as event #4). If EMS 520 finds several CGI with the target PCI, EMS 520 may respond to the CGI request with a lookup failure.

If Cell A 515 receives a successful response to the CGI request (e.g., the unique CGI) from EMS 520, Cell A 515 may decide to add the neighbor (Cell B 510) relation to its ANR. If Cell A 515 receives a lookup failure from EMS 520, the neighbor discovery procedure will be interrupted.

FIG. 6a illustrates a flow diagram of eNB operations 600 in deriving CGI based on eNB/EMS specific operations. eNB operations 600 may be indicative of operations occurring in an eNB while the eNB is participating in ANR with an EMS. eNB operations 600 may occur while the eNB is in a normal operating mode.

eNB operations 600 may begin with the eNB receiving a measurement report from a UE served by the eNB (block 605). According to an embodiment, the measurement report from the UE may include a PCI of a cell detected by the UE. The eNB may request a CGI for the cell reported by the UE from the EMS (block 610). In the request to the EMS, the eNB may include the PCI of the cell along with geo-location information, antenna azimuth information, antenna down tilt information, and so forth, of itself. The eNB may then receive the CGI for the cell from the EMS (block 615). It may be possible that the EMS was not able to determine the CGI for the cell. In such a situation, the eNB may receive an error indication from the EMS. The eNB may add the cell to a neighbor list using the CGI for the cell. eNB operations 600 may then terminate.

FIG. 6b illustrates a flow diagram of EMS operations 650 in deriving CGI based on eNB/EMS specific operations. EMS operations 650 may be indicative of operations occurring in an eMS while the EMS is participating in ANR with an eNB. EMS operations 650 may occur while the EMS is in a normal operating mode.

EMS operations 650 may begin with the EMS receiving a request from the eNB to determine the CGI for a cell (block 655). According to an embodiment, the request from the eNB may include a PCI for the cell along with geo-location information, antenna azimuth information, antenna down tilt information, and so forth, of the eNB.

The EMS may then determine the CGI for the cell (block 660). According to an embodiment, the EMS may determine the CGI by calculating a possible neighbor cell list based on the geo-location information, antenna azimuth information, antenna down tilt information, and so forth, of the eNB and then the EMS may look up the PCI of the cell in the possible neighbor cell list. The possible neighbor cell list may be a neighbor list for the cell, an intra-frequency neighbor list for the cell, a subset of a neighbor list for the cell, a subset of an intra-frequency neighbor list for the cell, or a combination thereof. If the EMS finds a unique CGI with the PCI, then the EMS may report the CGI to the eNB (block 665). However, if the EMS does not find a unique CGI with the PCI, then the EMS may report an error indication to the eNB. EMS operations 650 may then terminate.

Figure 7:
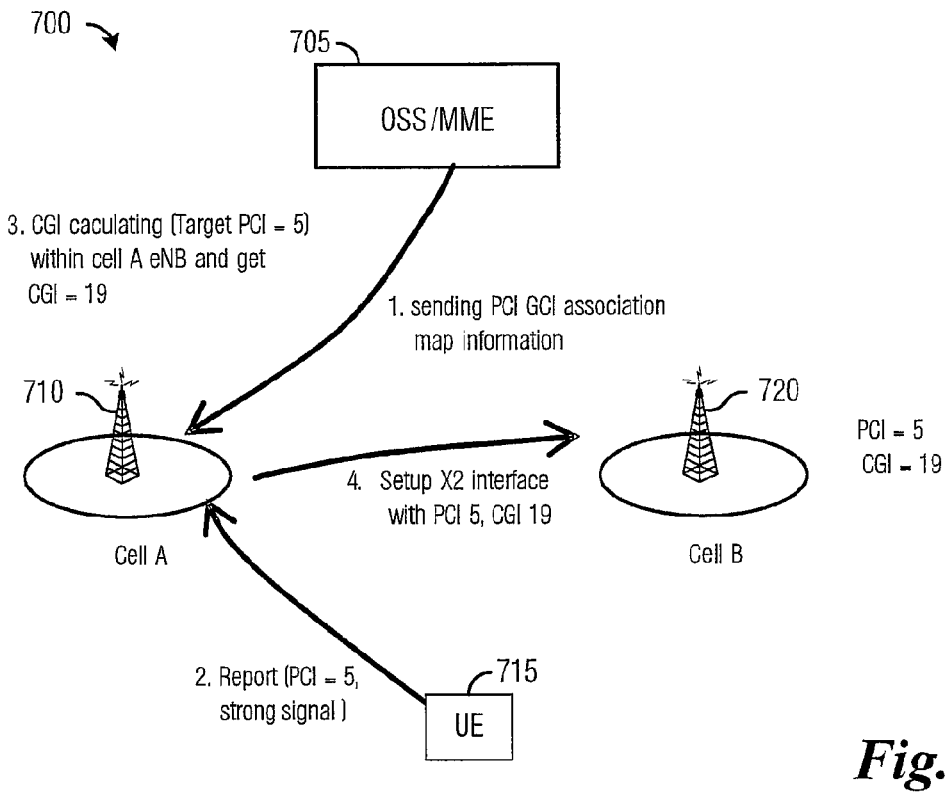
FIG. 7 is a diagram of a communications system, wherein CGI derivation is based on eNB specific operations.

FIG. 7 illustrates a communications system 700, wherein CGI derivation is based on eNB specific operations. As shown in FIG. 7, CGI derivation using eNB specific operations may begin with an OSS 705 providing CGI mapping information to an eNB, such as Cell A 710 (shown as event #1). The providing of the CGI mapping information may be provided by OSS 705 to Cell A 710 before use of any CGI derivation mechanisms. Cell A 710 may save the CGI mapping information for later use. According to an embodiment, the CGI mapping information may include information such as a particular CGI mapping formula to use, including which inputs to use and input format, and so forth.

A UE 715 may send a measurement report regarding a cell, such as Cell B 720, to its serving cell, Cell A 710 (shown as event #2). The measurement report may contain the PCI of Cell B 720 but not it's CGI. Cell A 710 may make use of the CGI mapping information provided by OSS 705 to derive the CGI (shown as event #3). Cell A 710 may set up a connection with Cell B 720 (shown as event #4).

To make the CGI unique within the PLMN, there are several mechanisms that may be used to map the PCI into the CGI. According to 3GPP TS36.331 technical standards, which are incorporated herein by reference, the CGI is defined as PLMN ID+CI. The IE CI may be used to unambiguously identify a cell within a PLMN. Total length of the CI is 28 bits with the leftmost bits of the CI corresponding to the eNB ID (defined in section 9.2.1.37 of 3GPP TS 36.413 technical standards, which is incorporated herein by reference). In case of a macro eNB, the eNB ID is 20 bits and the CI is 8 bits.

According to an alternative embodiment, in addition to deriving the CGI from the possible neighbor cell list, the eNB may also be able to determine the CGI from a MAC address from transport (part of a MAC ID associated with a transport ID address) and the PCI. For example, the EMS may extract 19 bits from the transport MAC address and 9 bits from the PCI. According to an alternative embodiment, the eNB may make use of an eNB vendor sequence number. The eNB vendor sequence number may include a base station eNB electronic serial number for each eNB. For example, the EMS may extract 19 bits from the eNB electronic serial number and 9 bits from the PCI.

According to yet another alternative embodiment, the eNB may make use of an eNB specific algorithm. For example, the eNB may take as input one or more input parameters and generates from the input parameters a CGI. There may be a requirement that one of the inputs be the 9 bit PCI. The other inputs may be operator configurable inputs, such as derived 19 bit information from positional information of the eNB, e.g., longitude and latitude information of the eNB. According to a further alternative embodiment, a planning tool may be used to map the PCI to the CGI using geo-location information and then output from the planning tool may be provided to the EMS from a network management system (NMS) using a Northbound or Itf-N interface. In general, the NMS manages one or more EMS. Since an operator of a communications system may have more than one equipment vendor, the NMS may be responsible for managing several EMS from different equipment vendors. The output, i.e., mapping information, may be used by the eNB via a database look-up along with geo-location information provided by the eNB whenever there is a PCI message request from a UE that may require CGI determination in order to setup neighbor relations for ANR and X2 interface auto setup.

Figure 8:
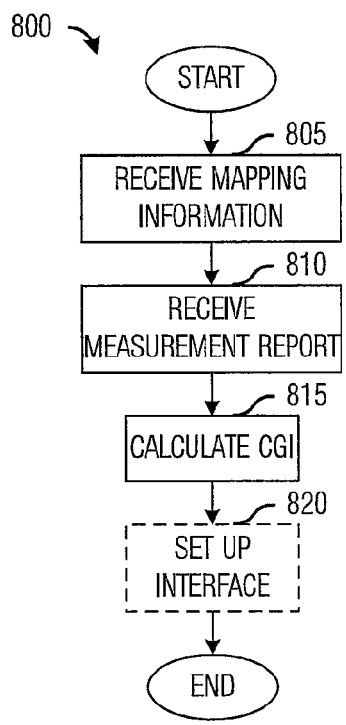
FIG. 8 is a flow diagram of eNB operations in deriving CGI based on eNB specific operations.

FIG. 8 illustrates a flow diagram of eNB operations 800 in deriving CGI based on eNB specific operations. eNB operations 800 may be indicative of operations occurring in an eNB while the eNB is participating in ANR with an EMS. eNB operations 800 may occur while the eNB is in a normal operating mode.

eNB operations 800 may begin with the eNB receiving CGI mapping information from an OSS (block 805). According to an embodiment, the eNB may store the CGI mapping information for subsequent use. The eNB may then receive a measurement report from a UE served by the eNB (block 810). According to an embodiment, the measurement report from the UE may include a PCI of a cell detected by the UE. The eNB may then compute the CGI from the information provided by the UE (i.e., the PCI of the cell detected by the UE) and the CGI mapping information provided by the OSS (block 815). The eNB may also make use of its own information, including geo-location information, antenna azimuth information, antenna down tilt information, and so forth. The eNB may also setup a connection to the cell detected by the UE (block 820). eNB operations 800 may then terminate.

Figure 9:
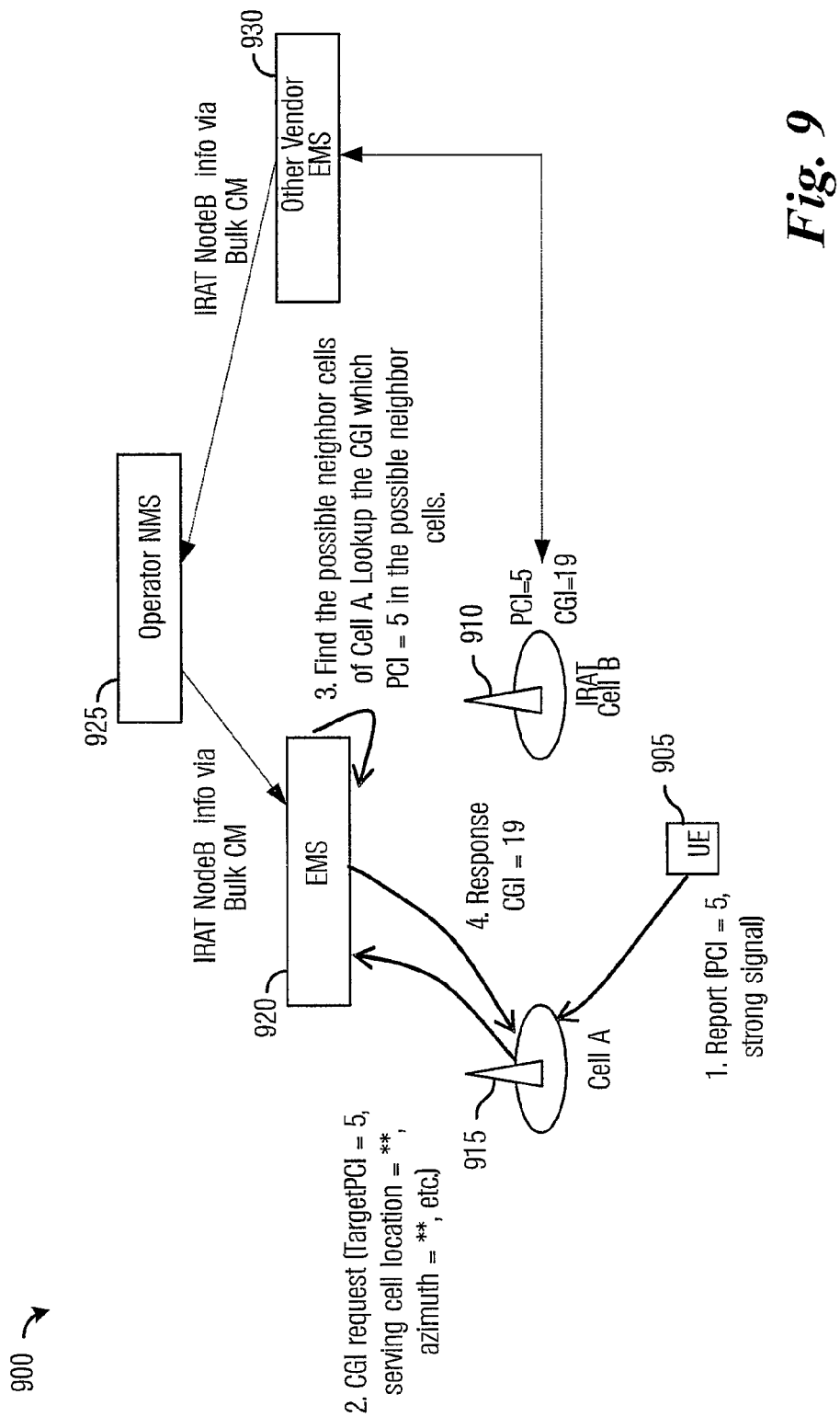
FIG. 9 is diagram of a communications system, wherein inter-RAT CGI derivation is performed without reports from air-interface measurements.

FIG. 9 illustrates a communications system 900, wherein inter-RAT CGI derivation is performed without reports from air-interface measurements. Without UE air-interface measurements, the inter-RAT CGI may be derived as follows:

1. A UE 905 sends a measurement report regarding a PCI for Inter-radio Access Technology (IRAT) Cell B 910 to Cell A 915. The report may contain the IRAT PCI of Cell B 910, but not it's IRAT CGI.

2. When Cell A 915 receives the measurement report from UE 905 containing the IRAT PCI, Cell A 915 may send an IRAT CGI request to EMS 920, using the discovered IRAT PCI and its own geo-location information, antenna azimuth angle information, down tilt information, and so on, as parameters.

3. After EMS 920 has received the IRAT CGI request, EMS 920 may calculate a possible neighbor cell list based on geo-location information, antenna azimuth angle information, down tilt information, and so forth, of Cell A 915. A possible method to derive the IRAT CGI is as shown in FIG. 9. Then EMS 920 will lookup the IRAT CGI with a target PCI against PCI of possible surrounding neighbor cells based on the geo-location information, antenna azimuth angle information, down tilt information, and so forth.

In a multi-vendor environment, EMS 920 may need to obtain information through the communications system's NMS 925 if Cell A 915 (service provided by a first vendor) is located at a service border with Cell B 910 (service provided by a second vendor). The information from an EMS 930 (provided by the second vendor) would need to be propagated to EMS 920. Information propagation may be done through the NBI or P2P connections. Via the NBI connection, using the Bulk CM IRP which will be supported by the first vendor, it is possible to obtain the second vendor's eNB information. The important information that is required for this procedure to work are the Latitude, Longitude, Antenna azimuth angle, down tilt, Physical Cell Id and Global Cell Id, and so forth, of Cell B 910.

4. If EMS 920 finds a unique CGI with the target PCI, it will respond with the CGI information back to Cell A 915. If EMS 920 finds several different CGI with the target PCI, it will provide a response indicating that the CGI lookup failed to Cell A 915.

Figure 10A:
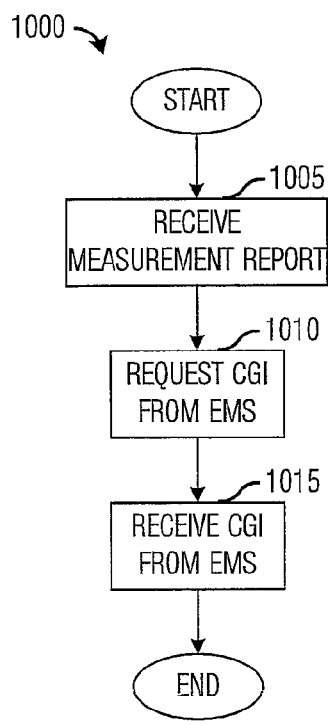
FIG. 10a is a flow diagram of eNB operations in deriving inter-RAT CGI based on eNB/EMS specific operations.

FIG. 10*a* illustrates a flow diagram of eNB operations 1000 in deriving inter-RAT CGI based on eNB/EMS specific operations. eNB operations 1000 may be indicative of operations occurring in an eNB while the eNB is participating in ANR with an EMS. eNB operations 1000 may occur while the eNB is in a normal operating mode.

eNB operations 1000 may begin with the eNB receiving a measurement report from a UE served by the eNB (block 1005). According to an embodiment, the measurement report from the UE may include a PCI of a cell detected by the UE. The eNB may request a CGI for the cell reported by the UE from the EMS (block 1010). In the request to the EMS, the eNB may include the PCI of the cell along with geo-location information, antenna azimuth information, antenna down tilt information, and so forth, of itself. The eNB may then receive the CGI for the cell from the EMS (block 1015). It may be possible that the EMS was not able to determine the CGI for the cell. In such a situation, the eNB may receive an error indication from the EMS. eNB operations 1000 may then terminate.

Figure 10B:
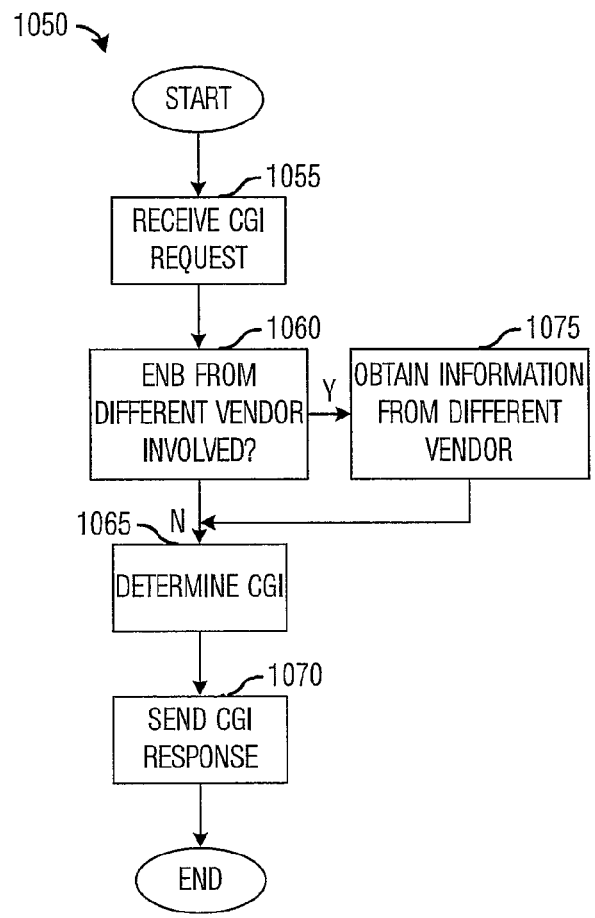
FIG. 10b is a flow diagram of EMS operations in deriving inter-RAT CGI based on eNB/EMS specific operations.

FIG. 10*b* illustrates a flow diagram of EMS operations 1050 in deriving inter-RAT CGI based on eNB/EMS specific operations. EMS operations 1050 may be indicative of operations occurring in an EMS while the EMS is participating in ANR with an eNB. EMS operations 1050 may occur while the EMS is in a normal operating mode.

EMS operations 1050 may begin with the EMS receiving a request from the eNB to determine the CGI for a cell (block 1055). According to an embodiment, the request from the eNB may include a PCI for the cell along with geo-location information, antenna azimuth information, antenna down tilt information, and so forth, of the eNB.

The EMS may then determine the cell is part of communications system with the same vendor as the eNB (block 1060). If the cell and the eNB are part of the same communications system with the same vendor, then the EMS may determine the CGI for the cell (block 1065). According to an embodiment, the EMS may determine the CGI by calculate a possible neighbor cell list based on the geo-location information, antenna azimuth information, antenna down tilt information, and so forth, of the eNB and then the EMS may look up the PCI of the cell in the possible neighbor cell list. If the EMS finds a unique CGI with the PCI, then the EMS may report the CGI to the eNB (block 1070). However, if the EMS does not find a unique CGI with the PCI, then the OSS may report an error indication to the eNB. EMS operations 1050 may then terminate.

However, if the cell and the eNB are not part of the same communications system with the same vendor (block 1060), then the EMS may need to obtain information regarding the cell from a different EMS managing the cell (block 1075). Once the EMS receives the information regarding the cell from the different EMS, the EMS may determine the CGI for the cell (block 1065). If the EMS finds a unique CGI with the PCI, then the EMS may report the CGI to the eNB (block 1070). However, if the EMS does not find a unique CGI with the PCI, then the EMS may report an error indication to the eNB. EMS operations 1050 may then terminate.

Figure 11:
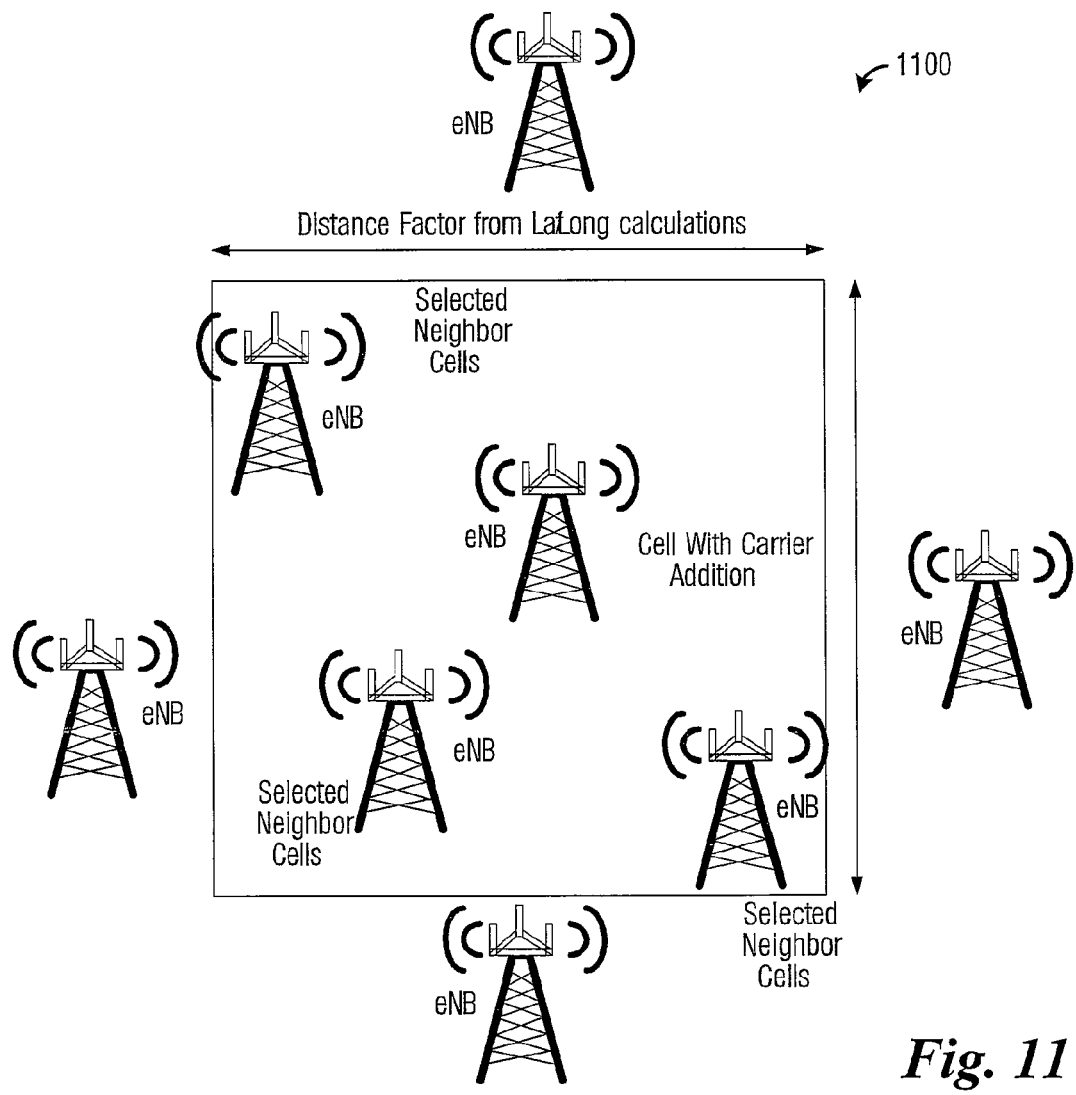
FIG. 11 is a diagram of a communications system.

FIG. 11 illustrates a communications system 1100. Communications system 100 includes an EMS (not shown) that may be used to determine which IRAT cells are potential IRAT neighboring cells using geo-location (Latitude and Longitude) information to deduce the IRAT CGI from the reported CGI.

As an example, the EMS may perform some geo-location calculation to determine a potential list of target IRAT neighbor cells. Using geo-location information, such as the longitude and latitude information of the cell, along with a distance factor, the EMS may compute a potential list of cells that fall within a specified distance from the eNB with the carrier addition. A box drawn about several cells illustrates the specified distance from the eNB with the carrier addition. Cells within the box may be within the specified distance from the cell with the reported IRAT PCI measurement and may be selected to check if the measured IRAT PCI is associated with any of the potential IRAT neighbor cells and if there is a unique IRAT PCI to IRAT CGI associated with a specific cell within the selected neighboring IRAT cells. Cells outside the box may not be selected to receive the configuration update messages from the EMS. The distance factor may be estimated based on cell morphology, radio frequency (RF) propagation characteristics, operating frequency, field test measurements, and so forth, whenever available.

The embodiments described herein provide a way to derive CGI without requiring UEs to make air-interface measurements. However, in some situations, it may be beneficial to be able to derive CGI from UE air-interface measurements. Therefore, a combination technique for deriving CGI wherein it is possible to derive CGI from UE air-interface measurements as well as PCI to CGI mappings may be desirable.

According to an embodiment, a UE may be initially instructed by an eNB to make air-interface measurements. However, if the UE does not respond within a specified period of time, the eNB may have the UE retry the air-interface measurements (there may be a retry limit). If after the limit on the UE making air-interface measurements has been met, then the eNB may switch to deriving CGI from PCI to CGI mappings.

According to another embodiment, an operator of the communications system may be able to select the technique for deriving CGI. For example, the operator may select that deriving CGI using UE air-interface measurements may be a default technique and deriving CGI using PCI to CGI mappings may be a fall-back technique if the UE air-interface measurements fail. Alternatively, the operator may select that deriving CGI using PCI to CGI mappings may be the default technique and that deriving CGI using UE air-interface measurements may be the fall-back technique if the PCI to CGI mappings fail.

Figure 12:
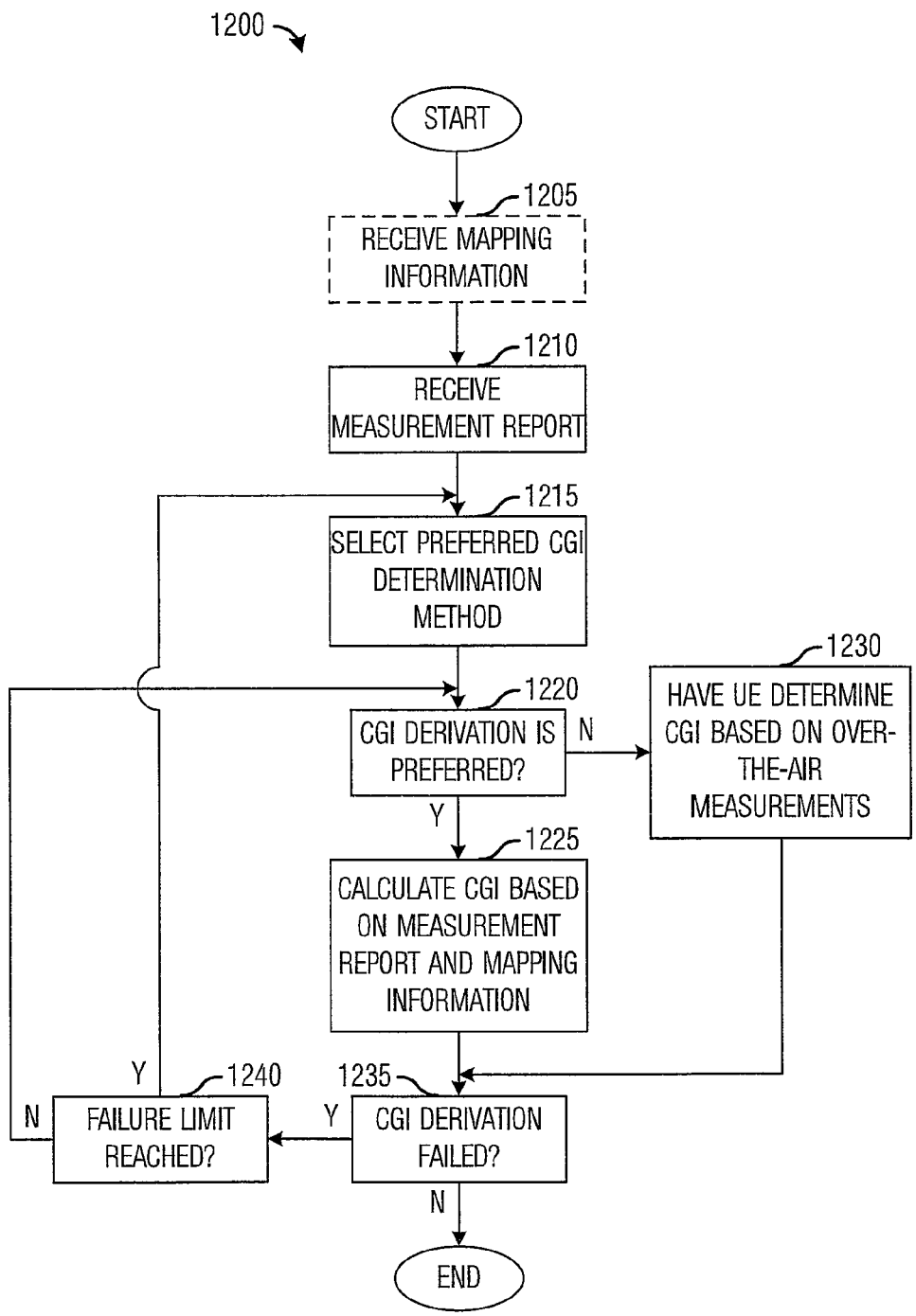
FIG. 12 is a flow diagram of eNB operations in deriving CGI with a combination of techniques making use of UE air-interface measurements and PCI to CGI mappings.

FIG. 12 illustrates a flow diagram of eNB operations 1200 in deriving CGI with a combination of techniques making use of UE air-interface measurements and PCI to CGI mappings. eNB operations 1200 may be indicative of operations occurring in an eNB as the eNB is deriving CGI for purposes of ANR, for example. eNB operations 1200 may occur while the eNB is in a normal operating mode.

eNB operations 1200 may begin with the eNB receiving CGI mapping information from an EMS (block 1205). According to an embodiment, the eNB may store the CGI mapping information for subsequent use. Receiving CGI mapping information may be optional depending on which technique for deriving CGI using PCI to CGI mapping is used. For example, if PCI to CGI mapping using both eNB and EMS operations is used, then it may not be necessary to receive CGI mapping information. However, if PCI to CGI mapping is performed only with eNB operations, then CGI mapping information may be needed.

The eNB may then receive a measurement report from a UE served by the eNB (block 1210). According to an embodiment, the measurement report from the UE may include a PCI of a cell detected by the UE. The eNB may then select a preferred method for deriving CGI (block 1215). According to an embodiment, the preferred method for deriving CGI may be based on factors including: UE capability (if the UE is not capable of deriving CGI from air-interface measurements, then the eNB must select PCI to CGI mapping as a way for deriving CGI), operating environment (if the UE is in a poor signal location, then it may be difficult for the UE to perform the air-interface measurements, then the eNB may prefer to select PCI to CGI mapping), time criticality or constraints (if timing performance is critical, then the eNB may prefer to select PCI to CGI mapping), and so forth.

According to an embodiment, a selection function may be used to select the preferred method for deriving CGI. Inputs may be provided to the selection function and the selection may select the preferred method for deriving CGI based on the input. Examples of the inputs may include: UE capability, UE operating environment, timing constraints and requirements, EMS/eNB load, an operating frequency configuration of the eNB, operating frequency configurations of neighboring cells of the eNB, a RAT configuration of the eNB, RAT configurations of the neighboring cells of the eNB, and so forth.

Additionally, the selection function may be able to switch the preferred method for deriving CGI if a failure is detected. For example, if deriving CGI from UE air-interface measurements fails (up to a specified number of times), then the selection function may switch the preferred method for deriving CGI using PCI to CGI mappings. Similarly, if deriving CGI using PCI to CGI mappings fails, then the selection function may switch the preferred method for deriving CGI to UE air-interface measurements. As discussed previously, the selection function may select the preferred method for an individual UE, for all UEs, for a subset of UEs, for clusters of UEs, for an individual cell, for all cells, for a subset of cells, for clusters of cells, for an individual base station, for all base stations, for a subset of base stations, for clusters of base stations, for an entire communications system, for UEs utilizing a particular RAT, for UEs utilizing a subset of RATs, or so forth. In other words, a granularity of the selection function may be set to any degree, from UE to communications system.

According to an embodiment, a preferred method for deriving CGI may be selected for each UE. According to another embodiment, the selection of the preferred method for deriving CGI may be performed periodically at specified intervals or at the occurrence of a specified event, for example, when a signal quality of transmissions from a UE falls below a first threshold or when an error rate exceeds a second threshold.

The eNB may then perform a check to determine which method for deriving CGI was selected (block 1220). If PCI to CGI mapping was selected for deriving CGI, then one of the embodiments presented herein may be used to derive CGI (block 1225). If UE air-interface measurements was selected for deriving CGI, then the prior art technique discussed earlier may be used to derive CGI (block 1230).

The eNB may perform a check to determine if the CGI derivation succeeded or failed (block 1235). If the CGI derivation succeeded then eNB operations 1200 may then terminate. If the CGI derivation failed, then the eNB may perform a check to determine if a failure limit (timer, counter, or so forth) has been reached (block 1240). If the failure limit has not been reached, then eNB operations 1200 may return to block 1220 to repeat the CGI derivation using the preferred CGI derivation method. If the failure limit has been reached, then eNB operations 1200 may return to block 1215 to reselect the preferred CGI derivation method, which may be performed by switching CGI derivation methods.

Figure 13:
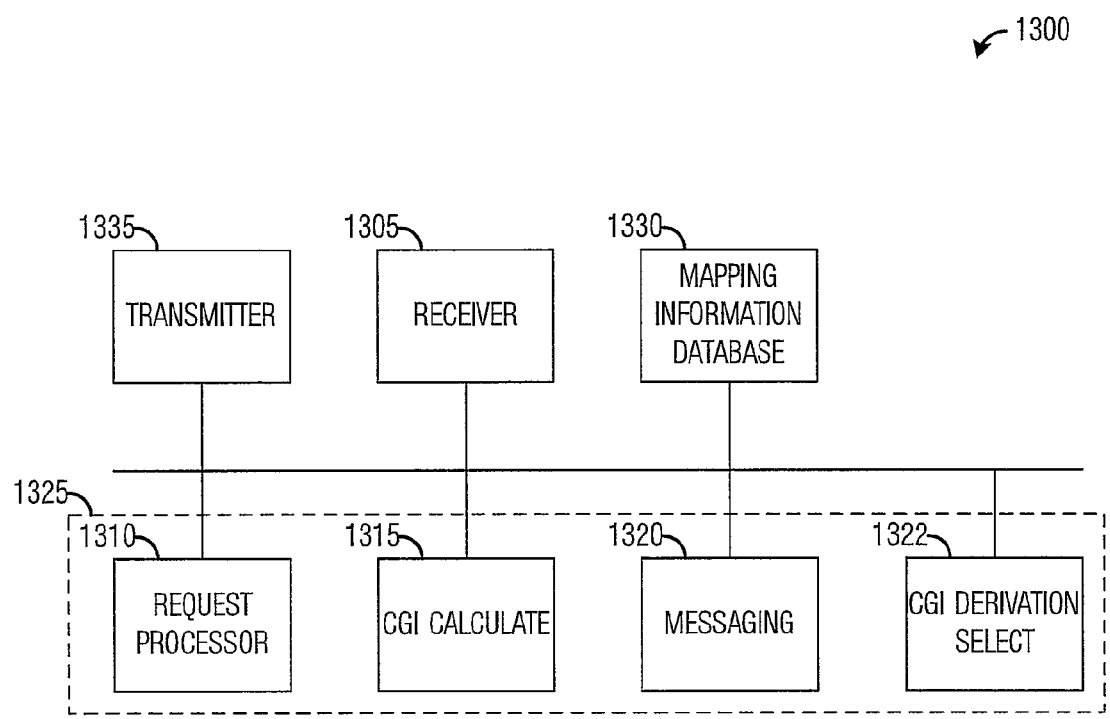
FIG. 13 is a diagram of an alternate illustration of a communications device.

FIG. 13 provides an alternate illustration of a communications device 1300. Communications device 1300 may be an EMS or an eNB. Communications device 1300 may be used to implement various ones of the embodiments discussed herein. As shown in FIG. 13, a receiver 1305 is configured to receive information.

In a situation wherein communications device 1300 is an EMS, a request processor 1310 is configured to receive and process CGI requests from eNB. If communications device 1300 is an eNB, then request processor 1310 may or may not be present, and if present, it may not be in active operation. A CGI calculate unit 1315 is configured to derive CGI from PCI as well as information related to an eNB that is deriving CGI or request the derivation of CGI. A messaging unit 1320 is configured to generate messages to transmit information or to extract information in received messages. A CGI derivation select unit 1322 is configured to select a CGI derivation technique, such as CGI derivation using air-interface measurements or PCI to CGI mapping, for example. Transmitter 1335 is configured to transmit information.

The elements of communications device 1300 may be implemented as specific hardware logic blocks. In an alternative, the elements of communications device 1300 may be implemented as software executing in a processor, controller, application specific integrated circuit, or so on. In yet another alternative, the elements of communications device 1300 may be implemented as a combination of software and/or hardware.

As an example, receiver 1305 and transmitter 1335 may be implemented as specific hardware blocks, while request processor 1310, CGI calculate unit 1315, messaging unit 1320, and CGI derivation select unit 1322 may be software modules executing in a processor 1325 or custom compiled logic arrays of a field programmable logic array. Mapping information database 1330 may be part of a memory in communications device 1300.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for deriving cell global information, the method comprising:
   receiving, by a network device in a first cell, a measurement report from a user device, wherein the measurement report includes a first identifier of a second cell;
   determining, by the network device, a second identifier for the second cell based on the first identifier and information about the first cell, wherein determining a second identifier comprises transmitting, by the network device, a request message to a manager of the first cell, wherein the request message comprises the first identifier and the information about the first cell, and receiving the second identifier from the manager; and
   adding the second cell to a cell list, wherein the second identifier is used to reference the second cell.

2. The method of claim 1, wherein the first identifier comprises a physical cell identity, and wherein the second identifier comprises a cell global identity.

3. The method of claim 1, wherein the information about the first cell comprises geo-location information, antenna azimuth information, antenna down tilt information, or a combination thereof.

4. The method of claim 1, wherein the second identifier is determined by searching a list of potential neighbor cells for the first cell and setting a unique second identifier corresponding to the first identifier as the second identifier.

5. The method of claim 1, wherein determining a second identifier comprises applying a mapping function to the first identifier and the information about the first cell.

6. The method of claim 5, wherein the second identifier is defined as a function of one or more inputs, wherein one of the inputs comprises the first identifier.

7. The method of claim 6, wherein the one or more inputs further comprises positional information of the first cell.

8. The method of claim 6, wherein the second identifier is defined as a sum of a public land mobile network identity, a radio network controller identity, and the first identifier.

9. The method of claim 6, wherein the second identifier is defined as a sum of a media access control identifier and the first identifier.

10. The method of claim 6, wherein the one or more inputs comprises a cell electronic serial number.

11. The method of claim 6, further comprising receiving second identifier mapping information prior to receiving the measurement report.

12. The method of claim 1, wherein the first identifier identifies the second cell as originating from a different vendor, and wherein determining a second identifier comprises obtaining information about the second cell from the different vendor.

13. A method for deriving cell global information, the method comprising:
   receiving, at a manager of a first cell, a second identifier request from a base station in the first cell, wherein the second identifier request comprises a first identifier of a second cell and information related to the first cell, the first identifier provided to the base station by a user device;
   determining, by the manager, a second identifier of the second cell from the first identifier and the information related to the first cell, wherein determining the second identifier comprises determining if there is a unique second identifier corresponding to the first identifier in a list of potential neighbor cells for the first cell, setting a second identifier to the unique second identifier if there is a unique second identifier, and setting the second identifier to an error indicator if there is not a unique second identifier; and
   transmitting the second identifier to the base station in the first cell.

14. The method of claim 13, wherein the list of potential neighbor cells comprises cells in a neighbor list for the first cell.

15. The method of claim 13, wherein the list of potential neighbor cells comprises cells in an intra-frequency neighbor list for the first cell.

16. A method of deriving cell global information, the method comprising:
   receiving, by a network device in a first cell, a measurement report from a user device, wherein the measurement report includes a first identifier of a second cell;
   selecting a first preferred second identifier derivation technique, wherein the selecting is based on a selection function;
   deriving, by the network device, a second identifier for the second cell using the first preferred second identifier derivation technique, wherein the deriving is based on the first identifier and information about the first cell; and
   adding the second cell to a cell list, wherein the second identifier is used to reference the second cell.

17. The method of claim 16, wherein a separate first preferred second identifier derivation technique is selected for an individual communication device, for all communication devices, for a subset of communication devices, for clusters of communication devices, for an individual cell, for all cells, for a subset of cells, for clusters of cells, for an individual base station, for all base stations, for a subset of base stations, for clusters of base stations, for an entire communications system, for communications devices utilizing a particular radio access technology (RAT), or for communications devices utilizing a subset of RATs, and wherein the selecting function has as input: communications device capability, communications device operating environment, timing constraints and requirements, an operating frequency configuration of the first cell, operating frequency configurations of neighbor cells of the first cell, a RAT configuration of the first cell, RAT configurations of the neighbor cells of the first cell, first cell load, or a combination thereof.

18. The method of claim 17, wherein the first preferred second identifier derivation technique is periodically selected or is selected upon an occurrence of an event.

19. The method of claim 18, wherein the event comprises a quality of transmissions by the communications device meeting a first threshold, an error rate of transmissions by the communications device meeting a second threshold, or a combination thereof.

20. The method of claim 16, wherein the first preferred second identifier derivation technique is selected from the group consisting of: deriving the second identifier from air-interface measurements, deriving the second identifier from a mapping function, and combinations thereof.

21. The method of claim 16, wherein deriving a second identifier for the second cell using the first preferred second identifier derivation technique fails, and the method further comprises selecting a second preferred second identifier derivation technique, wherein the selecting is based on the selection function.

22. The method of claim 21, wherein deriving a second identifier for the second cell using the first preferred second identifier derivation technique fails a specified number of times.

23. The method of claim 21, wherein the second preferred second identifier derivation technique is different from the first preferred second identifier derivation technique.

24. A network entity comprising:
   a compute unit configured to derive a second identifier for a first cell based on a first identifier for the first cell and information related to a second cell, the first identifier being initially provided to a base station in the first cell by a user device;
   a messaging unit coupled to the compute unit, the messaging unit configured to generate a message containing the second identifier; and
   a transmitter coupled to the messaging unit, the transmitter configured to send the message containing the second identifier.

25. The network entity of claim 24, further comprising an identifier derivation select unit coupled to the compute unit, the identifier derivation select unit configured to select a technique used to derive the second identifier.

26. The network entity of claim 25, wherein the identifier derivation select unit selects the technique based on a communications device's capability, the communications device's operating environment, timing constraints, or a combination thereof.

27. The network entity of claim 24, further comprising a request processor coupled to the messaging unit, the request processor configured to receive and process requests for second identifier derivation.

28. The method of claim 1, wherein the second identifier is not provided by a user equipment (UE) to the network device in the first cell.

29. The method of claim 13, wherein the second identifier is not provided by a user equipment (UE) to the base station in the first cell.

30. The method of claim 16, wherein the second identifier is not provided by a user equipment (UE) to the network device in the first cell.

31. The network entity of claim 24, wherein the second identifier is not provided by a user equipment (UE).

* * * * *